United States Patent [19]
Estey et al.

[11] 3,821,446
[45] June 28, 1974

[54] PROCESS FOR PRODUCING DRIED, POTATO-CONTAINING ANIMAL FOOD SUPPLEMENT

[76] Inventors: Bernard A. Estey, RFD No. 1, Mapleton, Maine 04757; Charles S. Estey, RFD No. 2, Presque Isle, Maine 04769; Owen S. Estey, RFD No. 1, Mapleton, Maine 04757

[22] Filed: Aug. 6, 1971

[21] Appl. No.: 169,800

[52] U.S. Cl.................. 426/373, 426/473, 426/374, 426/807
[51] Int. Cl............................................. A23b 7/03
[58] Field of Search......... 99/100, 103, 207, 2, 154; 426/342, 373, 443, 465, 473, 478

[56] References Cited
UNITED STATES PATENTS

| | | | |
|---|---|---|---|
| 422,370 | 3/1890 | Brott | 99/2 |
| 2,013,476 | 9/1935 | Peebles | 99/2 |
| 2,227,246 | 12/1940 | Canck | 99/154 |
| 2,295,643 | 9/1942 | Emery | 99/2 |
| 2,487,162 | 11/1949 | Meyer | 99/2 |
| 2,690,969 | 10/1954 | Pascale | 99/2 |

OTHER PUBLICATIONS

Feeds & Feedstuffs, Morrison, Ithaca, N.Y. 1957. pp. 389, 390, 555.

*Primary Examiner*—Norman Yudkoff
*Assistant Examiner*—Martin G. Mullen
*Attorney, Agent, or Firm*—Clarence A. O'Brien; Harvey B. Jacobson

[57] ABSTRACT

An animal food supplement composition is made from dehydrating potato-containing material, such as raw, fried, cooked or scrap potatoes, having a water content of about 75–90% by weight and hydrated lime as a binding agent. The potato-containing material is masticated and the lime added. The resultant mixture is ground and a portion of the final product is recycled and added to reduce the water content to about 60–65% by weight. The product is then dried to a water content of 5–10% by weight, and rapidly cooled.

12 Claims, No Drawings

PROCESS FOR PRODUCING DRIED, POTATO-CONTAINING ANIMAL FOOD SUPPLEMENT

The present invention relates to a novel product suitable for use as an animal feed supplement and obtained from potatoes and potato products.

The present invention further relates to a process for preparing a product from potatoes and potato waste products which can be employed as an animal feed supplement. The use of potatoes in various raw and cooked forms as food and food supplements has been known for many years.

Further, various food products for both human and animal consumption have also been known in the prior art for some time. For example, U.S. Pat. No. 611,017 to Neumann discloses a method for preparing desiccated potatoes which can be reconstituted for human consumption. According to the process of Neumann, the potato is subjected to sulfur dioxide and the moisture extracted by compression. U.S. Pat. No. 2,176,347 to Jansen also discloses a process for preparing a food product from potatoes or other starchy vegetables whereby the potato is first soaked in water and then treated in a solution of an organic acid to preserve the potato from discoloration. Following this treatment, the potatoes are ground up, drained, and finally dehydrated. U.S. Pat. No. 2,705,679 to Griffiths et al. discloses the preparation of potato food products by subjecting diced potatoes to a hot stream of air of sufficient velocity to puff or expand the potatoes leaving the centers hollow. Subsequently, the product is dehydrated to give a product having a crisp, brittle texture. U.S. Pat. No. 2,295,643 to Emery discloses a process of modifying protein-containing materials with metals to produce feedstuffs for cattle. In this process, the protein-containing material is heated together with a metal or a metal derivative and an edible protein-splitting acid.

It will be observed, however, that none of the teachings of the prior art are concerned with a process capable of utilizing waste potato scraps in various forms as well as whole potatoes to obtain a food product suitable for use as a feed supplement for cattle.

Accordingly, it is an object of the present invention to provide a novel process for economically and easily converting used potato products as well as new whole potatoes into a dehydrated food product which can be fed to cattle.

It is a further object of the present invention to provide a novel means for utilizing waste potato scraps and products which would otherwise be useless and require disposal procedures.

These and other objects are accomplished in accordance with the process of this invention whereby potato-containing material is first masticated to give a uniform product consisting of protein, fat and fiber. Next, hydrated lime is blended in and the resultant mixture ground together. Dried potato meal is then added, and the mixture is dehydrated to remove moisture. Finally, the mixture is rapidly cooled and collected into suitable containers for storage and subsequent use.

The potato-containing materials which can be converted into a useful animal food supplement according to the present invention may be any potato-containing material whether raw, fried, cooked, new, used or scrap. For example, raw whole potatoes, scrap potatoes, potato peels or any other part of a raw potato may be used. Also, cooked potato products such as french fries, baked potatoes, hash-brown potatoes and so forth may also be used. Moreover, scrap or waste potato products such as peels of baked potatoes, waste french fries and so forth can also be used.

It is contemplated within the scope of the present invention that mixtures of the above potato-containing materials will be combined in appropriate proportion so that the average water content of the mixed and blended potato-containing materials will be about 75–90 percent by weight. The various different potato-containing materials may be mixed together before being masticated or they may be first masticated and then mixed together, so long as the water content remains within the desired about 75–90 percent range.

The mastication of the potato-containing material can be carried out with any conventional equipment which will transform the potato-containing material into a homogeneous mixture of protein, fat and fiber. For example, an ordinary screw conveyor has been found to be effective in masticating whole potatoes, potato peels and french fries, either alone or together.

After the potato material has been masticated, hydrated lime is added. The amount of hydrated lime added should be sufficient to bind the potato products together so that the product does not get mushy during the subsequent treatment steps. The amount of lime depends, of course, on the wetness of the masticated or blended potato materials. It has been found that when the water content of the blended potato materials is controlled within the specified 75–90 percent by weight range, approximately one part lime to 50 parts potato is necessary to accomplish the desired binding of the potato products. In this regard, it is desired that that ultimate product of the process have a calcium content of about 4–9 percent by weight, preferably about 5 percent by weight. Therefore, it is important to coordinate the initial water content of the mixed and blended potato products with the quantity of hydrated lime to be added to insure that proper binding is effected without causing the calcium content in the final product to vary outside the desired range.

The mixture of hydrated lime and potato protein, fat and fiber is then blended to form a homogeneous mass. At this point, the blended mass may optionally be subjected to a metal detector in order to locate and remove any foreign pieces of metal which may be present in the blended mass.

Next, the blended mass is ground into fine granular particles. This may be accomplished by any conventional grinder such as a hammermill grinder. For example, a grinder which has been found to be particularly effective is a Reitz Disintigrator equipped with a one-half inch screen.

To the ground mass is then added a certain proportion of dry potato meal. Dry potato meal is obtained by recycling part of the product stream of the dryer as subsequently described or part of the final product stream of the process. Sufficient dry potato meal should be recycled at this point in the process to obtain moisture content of the ground mass, dry potato meal mixture of about 60–65 percent by weight. The desired 60–65 percent moisture content is generally achieved by recycling one part dry potato meal for each three-eighths parts, preferably six-eighths parts, ground mass by weight. It has been unexpectedly found that this recycled step materially improves the fluffiness of the ultimate product, and also prevents caking of the product in the drying equipment.

After blending with dry potato meal, the mixture is fed into a conventional dryer where most of the moisture in the mixture is removed. More specifically, the drying is continued until the mixture is dehydrated to a moisture content of about 5–10 percent by weight. The drying step can be conveniently carried out with any conventional drying equipment. For example, a Heil Dehydrator, which is a triple pass rotating drum dehydrator and is shown in U.S. Pat. Nos. 2,316,459; 2,319,673; 2,319,674; 2,414,641; 2,752,130 and 2,777,642, has been found to be very effective. In carrying out the drying step, it has been found that inlet temperature to which the mixture is subjected can range from about 1000°F to about 2000°F, while the preferred outlet temperature should be maintained between about 200°F to 250°F. This low output temperature should assist in the rapid cooling necessary to prevent breakdown of the dried product when hot.

After drying, the dehydrated product may optionally be subjected to a mechanical vibrator shaker to remove any foreign matter from the product. Conventional shaker equipment is satisfactory. If such equipment is used, the dry potato meal recycled for blending with the grinder product stream may be obtained from the product stream of the vibrator shaker.

After the drying step or the optional vibrator step, the mixture is promptly cooled. It is essential that the mixture be cooled within about 5–10 minutes after its outlet from the dryer to a temperature in the range of about 70°–95°F in order to prevent breakdown of the protein molecules in the mixture and the corresponding emission of objectionable odors.

It has been found that the cooling step can be conveniently carried out with a conventional cyclone blower in a holding bin. The dried meal normally enters the bin at about 150°F, and the temperature is decreased within a few minutes to about 70°–80°F. After the material has been cooled, it is ready for its ultimate use and is transferred to a loading bin to await shipment.

One sample of the dry potato meal product according to this invention has been analyzed to have the following chemical properties:

| | |
|---|---|
| Protein | at least 6% |
| Fat | no more than 4% |
| Fibre | no more than 5% |
| Ash | approximately 12% |
| Calcium | approximately 5% |
| Phosphorous | approximately 0.28% |
| Nitrogen Free Extract | approximately 59% |

The following examples are provided to illustrate the process of the present invention and is not to be construed as limiting the scope of the invention described herein.

EXAMPLE I

Whole potatoes, french fries, potato peelings and other potato by-products were dumped into separate bins and then mixed in the ratio of 120 parts whole potatoes, 40 parts french fries, 10 parts potato peelings, and 30 parts ground potatoes. The mixing was accomplished by use of screw conveyors to give a uniform product of protein, fat and fiber having a moisture content of approximately 85 percent. After blending, hydrated lime was added at the rate of 66 pounds lime for each ton of wet product.

The mixture was then ground in a Reitz Disintegrator to a mass of fine granular particles. The product was then passed into a holding bin and, in turn, screw conveyed into another blending screw where 10 parts dry potato meal, recycled from the vibrating shaker product stream, was added for each 62 parts ground mixture to make a fluffy textured material. From this blending screw conveyor, the product was fed into a Heil Dehydrator which reduced the moisture content to 7 percent. After the moisture was removed, the dry product, having an exit temperature of 225°F, was screw conveyed to a vibrating shaker to remove any foreign matter from the product. From the vibrating shaker, the meal was screw conveyed to a holding bin where part of the meal was recycled to be mixed with the ground mass product of the dehydrator as described above, and the remainder was cooled by a conventional cyclone to 80°F. The temperature of the dried product was dropped to 80°F. within 5 minutes from the time the product exited from the dryer. The product was then transferred to a holding bin and stored for shipment. The ultimate product had approximately 6 percent protein, 4 percent fat and 5 percent fiber.

EXAMPLE II

The procedure of Example I was followed except that the feed consisted of a mixture of 100 parts whole potatoes, 60 parts french fries and instant potato waste, 15 parts potato peels and 35 parts ground potatoes. These were mixed to form a uniform product having a water content of approximately 75 percent. Fifty pounds of hydrated lime were then added per ton of wet product. After dehydration, 8 parts of dry potato meal was added per 61 parts disintegrated product. The mixture was dehydrated to a moisture content of 8 percent with the exit temperature from the dehydrator being about 230°F. The dried product was then cooled to 90°F. to produce an ultimate product having approximately 6-½ percent protein, 6 percent fat and 4 percent fiber.

EXAMPLE III

The procedure of Example I was followed except that feed consisted of 130 parts whole potatoes, 20 parts french fries and instant potato waste, 5 parts potato peels and 45 parts ground potatoes. This was mixed to give a uniform product containing a water content of approximately 80 percent. Hydrated lime was added in an amount of 60 pounds of lime per ton of wet product. Dry potato meal was recycled in an amount of nine parts dry potato meal to 62 parts of ground mixture, and the resultant mixture was dried to a moisture content of 7-½ percent with an exit temperature of about 240°F. The mixture was cooled to 95°F. to form an ultimate product containing approximately 7 percent protein, 4 percent fat and 3 percent fiber.

While the foregoing describes the preferred embodiments of the invention, it will be understood by those skilled in the art that various modifications may be made without departing from the invention.

Accordingly, it is intended that the present invention be limited only as defined by the appended claims.

We claim:

1. A process for the production of an animal food supplement comprising masticating potato-containing material having a water content of about 75–90 percent by weight; adding hydrated lime in sufficient quantity to bind said potato-containing material but insufficient to produce a supplement having in excess of 9 percent, by weight, calcium therein; grinding the resultant mixture; admixing an amount of recycled ultimate product to reduce the water content to about 60–65 percent; by weight; heating to a temperature at least above 200°F to dry said admixture to a water content of about 5–10 percent by weight; and rapidly cooling the dried mixture to a temperature of from 70°–95°F within about 10 minutes following drying.

2. The process of claim 1 wherein the potato-containing material comprises whole potatoes, potato peels, and parts of whole potatoes.

3. The process of claim 1 wherein the potato-containing material includes scrap or waste potatoes or potato parts.

4. The process of claim 2 wherein the potato-containing material is raw.

5. The process of claim 2 wherein the potato-containing material is cooked.

6. The process according to claim 1 wherein the potato-containing material is composed at least two components selected from whole potatoes, scrap potatoes, scrap parts, potato peels, french fries, baked potatoes or hash-brown potatoes.

7. The process according to claim 1 wherein hydrated lime is added in an amount sufficient to cause the ultimate product to have a calcium content of about 4 to about 9 percent by weight based on the weight of the product.

8. The process according to claim 7 wherein the amount of hydrated lime added is sufficient to cause the ultimate product to have a calcium content of about 5 percent based on the weight of the ultimate product.

9. The process according to claim 1 wherein the amount of recycled dry potato meal added is about one-eighth to about one-third part by weight ultimate product per part ground mixture.

10. The process according to claim 1 wherein said ground mixture is dried at a temperature of from about 200°–2,000°F.

11. The process according to claim 1 wherein the mixture is vibrated after the drying step to remove any foreign matter.

12. The process of claim 1 including the additional steps of locating and removing foreign pieces of metal following grinding.

* * * * *